United States Patent [19]

Sekida et al.

[11] 4,253,755
[45] Mar. 3, 1981

[54] CAMERA SHUTTER

[75] Inventors: Minoru Sekida, Sakai; Akira Fujii, Osaka; Toshio Kobori, Sakai; Tougo Teramoto, Wakayama, all of Japan

[73] Assignee: Minolta Camera Kabushiki Kaisha, Osaka, Japan

[21] Appl. No.: 901,051

[22] Filed: Apr. 28, 1978

[30] Foreign Application Priority Data

May 11, 1977 [JP] Japan .......................... 52/58826[U]

[51] Int. Cl.³ .......................... G03B 9/32; G03B 9/40
[52] U.S. Cl. .............................. 354/242; 350/276 SL; 354/246
[58] Field of Search .................. 354/242–244, 354/246, 247; 350/276 R, 276 SL, 266, 272

[56] References Cited

U.S. PATENT DOCUMENTS

| | | | |
|---|---|---|---|
| 1,492,357 | 4/1924 | Chamberlin | 354/243 |
| 2,134,766 | 11/1938 | Shieber et al. | 354/243 |

FOREIGN PATENT DOCUMENTS 45005 of 1972 Japan ........................ 354/242

Primary Examiner—David Smith, Jr.
Assistant Examiner—Shelley Wade
Attorney, Agent, or Firm—Wolder, Gross & Yavner

[57] ABSTRACT

A camera focal plane shutter including longitudinally movable leading and trailing curtains is provided along the transverse border of one of the curtains with a transverse shield element projecting into and terminating along a line disposed in the path of the other curtain and functions to shield the objective lens traversing light obliquely incident in the area of the curtain overlapping portions. The shield element may be a transversely curved strip or loop integrally formed with or clamped to the respective curtain border by an edge defining channel member, or may be an extension of a respective channel member arm or may be a light weight bar bonded to the curtain member proximate its channel member clamped border.

6 Claims, 7 Drawing Figures

CAMERA SHUTTER

The present invention relates generally to improvements in camera shutters and it relates particularly to an improved focal plane shutter in which leakage of light is prevented during the charging or cocking of the shutter curtains, particularly when the shutter charging operation remains uncompleted.

In the conventional focal plane shutter, the leading and trailing curtains are spring-loaded by being wound around a shaft, with their edge cover members overlapping each other, upon the cocking or charging of the shutter. Since the leading and trailing curtains are brought into an overlapping relation, the light traversing an objective lens and incident on the shutter curtains i.e., at a right angle thereto is effectively shielded, but the light incident oblique or aslant to the curtains is likely to pass through a small gap between the edge cover members of the both curtains maintained in an overlapping relation, resulting in the leakage of light, particularly when the charging operation of the shutter is interrupted in its course. The leakage of light occurs when the light is incident aslant to both curtains, enters a gap between the overlapping curtains and is then reflected back and forth between the opposed surfaces of the edge cover members of the respective curtains to eventually reach the film plane, as shown in FIG. 1 of the drawings.

To overcome this drawback, a device having a metal edge cover member of a modified configuration, as shown in FIG. 2, has been proposed. In such a device, a slit-defining metal edge cover member 3 on one shutter curtain 1 is of S-shaped transverse cross section. S-shaped edge cover member 3 clamps the end border of shutter curtain 1 between opposing legs thereof and surrounds a U-shaped metal edge cover member 4, which sandwiches the end border of the other shutter curtain 2 between another pair of opposing legs thereof.

With the aforesaid arrangement, oblique light e as shown in FIG. 1 is shielded from the film plane and such means is highly effective in preventing the leakage of light e. However, upon the release or charging of the shutter for exposure, the free end 3c of edge cover member 3 would contact and damage the film surface, or ruin shutter curtain 2. Furthermore, such an arrangement effects an appreciable increase in the mass of the shutter curtain 1 having edge member 3, as well as disturbing the equilibrium in inertia between the shutter curtain 1 and the other shutter curtain 2 having edge member 4. This leads to a difference in the travelling speeds at exposure between both curtains which are wound around respective drive shafts, resulting in a lack of uniform exposure. To avoid such shortcoming in exposure, great skill and high time consumption are required for the adjustment thereof, thus leading to an increase in manufacturing cost, as well as to a considerable increase in the inertia of each curtain with its consequent disadvantages.

SUMMARY OF THE INVENTION

It is accordingly a principal object of the present invention to provide an improved camera shutter. Another object of the present invention is to provide an improved focal plane shutter device equipped with light-shielding means, which provides a uniform exposure, without increasing the inertia of the shutter members or disturbing the equilibrium in inertia between these shutter members.

It is still another object of the present invention to provide an improved shutter device equipped with a light-shielding means in which any likelihood of breaking or damaging the film surface or shutter members is obviated.

It is a further object of the present invention to provide an improved focal plane shutter device having light-shielding means, which is simple in construction, reliable and easy to apply.

The above and other objects of the present invention will become apparent from a reading of the following description taken in conjunction with the accompanying drawings which illustrate preferred embodiments thereof.

In a sense, the present invention contemplates the provision of an improved light proof focal plane shutter comprising longitudinally movable leading and trailing shutter curtains whose free end borders overlap during the cocking of the shutter and characterized in the provision along the end border of one of the shutter curtains of a transversely extending light shield member projecting into and having its outermost edge disposed in the path of the second curtain member. The portion of the shield member intercepting the path of the other curtain member is slightly longitudinally offset from the free outer edge of the second curtain member during the normal overlapping condition of the curtain member borders during the cocking operation. In the preferred embodiments of the improved structure, the end transverse edges of the curtain members are each clamped by a channel member coextensive with the width of the respective curtain member and the shield member may be separate from or integral with the respective curtain and may be clamped thereto by the end channel member or may be integrally formed with a leg of the channel member or may be bonded directly to the curtain. The shielding portion of the shield member may be a transversely curved strip, or a loop or a light weight bar and is coextensive in width with the respective shutter curtains.

The improved shutter carried light shield is highly effective and reliable, simple and light weight, inexpensive, easy to fabricate and apply, free of any likelihood of interfering with the optimum uniform operation or inertial balance of the shutter and of damaging the film or the shutter.

DESCRIPTION OF THE PREFERRED EMBODIMENTS

Figure 1:
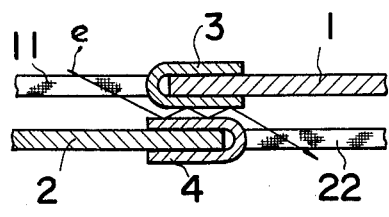
FIG. 1 is a fragmentary longitudinal sectional view of a conventional focal plane shutter curtain structure.
Figure 2:
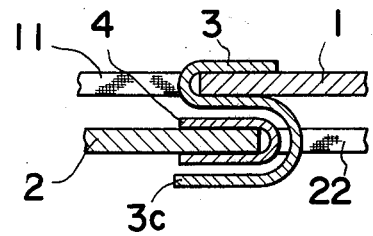
FIG. 2 is a view similar to FIG. 1 of another prior art shutter curtain structure.

Referring now to the drawings, particularly FIGS. 3 to 7 thereof, which illustrate preferred embodiments of the present invention, each of the embodiments including first trailing and second leading flexible curtains 1 and 2 which are moved along respective parallel proximate, substantially superimposed parallel paths by pairs of opposing bands, ribbons or strings 11 and 22 engaging the border end portions of end edge cover channels of respective curtains 1 and 2. Any conventional mechanism is provided for retracting the curtains 1 and 2 in end border overlapping relation and loading springs for advancing the curtains in an exposure stage in the direction of arrow P and for controllably sequentially releasing the curtains 1 and 2 to effect exposure, in a manner well known in the art, such mechanisms being likewise well known.

The outer free transverse end edge of curtain 2 is engaged by a transversely coextensive reinforcing channel 4 between whose opposing legs the end beveler of curtain 2 is sandwiched and clamped. It should be noted that each of the curtains 1 and 2, during their travel transversely oscillate, that is in a direction perpendicular to their direction of travel and the paths of the respective curtains are delineated by the space traversed by the oscillating longitudinally moving curtains and clamp channels.

Figure 3:
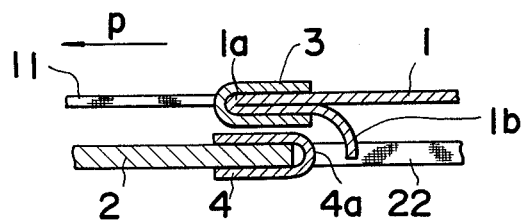
FIG. 3 is a fragmentary longitudinal sectional view of the curtain members of a focal plane shutter embodying the present invention, the shutter curtains being illustrated in closed overlapping relation.

In FIG. 3 of the drawings, there is shown a first embodiment of the present invention in which the focal plane shutter first curtain 1 has its end transverse border 1a reverse folded into underlying superimposition with the curtain 1 and then folded and directed to project into the path of second curtain 2. The projecting free end portion of curtain 1 defines a light shield or tongue, integrally formed and transversely coextensive with first curtain 1 and extending into the path of second curtain 2 and terminating in an outer or free edge which lies in such path, advantageously in the path of clamp channel 4 with the longitudinally reciprocating movement and transverse oscillation of second curtain 2. The superimposed folded portions of first curtain 1 are sandwiched between and clamped by the opposing legs of a reinforcing channel 3 which is transversely coextensive with first curtain 1 and the light shield tongue 1b is curved to a configuration advantageously parallel to the confronting end face 4a of clamp channel 4. The tongue 1b is rendered self shape retaining, rigid or semirigid in any suitable manner, for example by impregnating the tongue 1b and at least part thereof extending into channel 3 with a thermosetting resin and heating the impregnated tongue to cure or at least partially cure the resin.

If the direction of arrow P is assumed to be the direction of travel of the shutter curtains during exposure, then the second shutter curtain 2 serves as the leading curtain, and the first shutter curtain 1 serves as the trailing curtain. Conversely, assuming that the shutter curtains travel during exposure in the direction opposite to the direction of arrow P, then first shutter curtain 1 functions as the leading curtain and the second shutter curtain 2 functions as the trailing curtain. In such case, curtain 2 instead of curtain 1, may be folded back along its free end portion and clamped between the opposing legs of edge cover channel member 4 in a manner similar to that of the first shutter curtain 1. Moreover, the resulting tongue member, like tongue member 1b of second shutter curtain 2 would be turned or directed upwards, as viewed in FIG. 3.

In either case, the tongue 1b prevents the light flux e as shown in FIG. 1 from reaching the film surface prevents as well any leakage of light which might otherwise occur in the course of the shutter charging or cocking operation.

Figure 4:
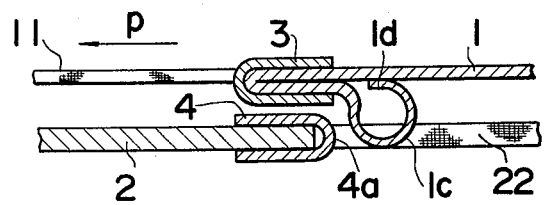
FIGS. 4 to 7 are views similar to FIG. 3 respectively illustrating other embodiments of the present invention.
Figure 5:
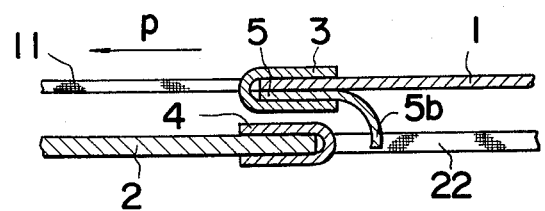

In the embodiment shown in FIG. 4, the free end portion of reverse under folded portion of the shutter curtain 1 shown in FIG. 3, is formed into a loop instead of a curved tongue with its free end 1d suitably bonded to the underface of first shutter curtain 1, thereby providing a transversely extending loop shaped projection 1c. The outer or lowermost edge of projecting loop 1c is positioned within the path or locus of the edge cover member 4 of second shutter curtain 2. With the structure of the last described embodiment, the initial configuration of the light-shielding member is maintained intact even after a long service, for a much longer period than the light-shielding member shown in FIG. 3.

In the preceding two embodiments, the light-shielding member is provided by folding back a free end portion or border of one shutter curtain. In contrast thereto, in the embodiment shown in FIG. 5, a separate preshaped curved piece of light-shielding sheet or film 5 is located with its upper end face in superimposed contact with the undersurface of the end border of the first shutter curtain 1 on the side closer to second shutter curtain 2, and clamped between the opposing legs of edge cover channel member 3, with the free end portion of the piece being turned in or downwards below the lower face of edge cover channel member 3, so that the projecting free end portion is in the form of a depending curved tongue 5b similar to tongue 1b shown in FIG. 3. The piece of sheet or film 5 may be made of a material similar to that of first shutter curtain 1 or it may be made of a material different from the first shutter curtain, and which may be readily formed into a tongue shape 5b. The tongue 5b intercepts and terminates in a lowermost edge in the path of channel member 4, like tongue 1b.

In this embodiment, the piece of film 5 projecting downwards beyond the lower portion of edge cover channel member 3 may be of a loop shape, with its free end portion or loop portion bonded to the undersurface of first shutter curtain 1, in the manner shown in FIG. 4.

Figure 6:
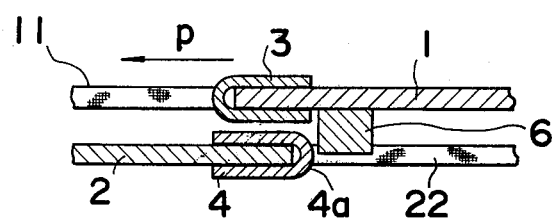

In the embodiment illustrated in FIG. 6, a bar shaped, transversely extending, depending projection 6 made of a material having light-shielding properties is formed or disposed on the undersurface of first shutter curtain 1. The projection 6 is provided at a position adjacent to the edge cover member 3 clamping the border end portion of shutter curtain between its legs, with the bottom end of projection 6 being positioned in the longitudinal path or the locus of the edge cover member 4 of second shutter curtain 2, so that the projection functions as a light-shielding member. The last described embodiment possesses the advantage that the material for projection may be suitably selected and a material light in weight can be employed.

Figure 7:
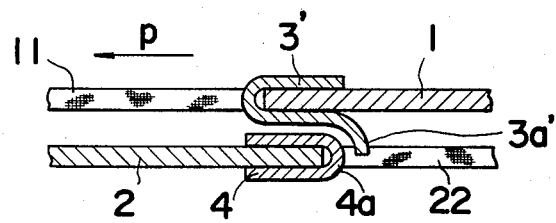

FIG. 7 shows another embodiment of the present invention, wherein the free end portion of the bottom leg of edge cover channel member 3' which engages the outer border of first shutter curtain 1 is bent downwardly at a right angle to second shutter curtain 2 to form a depending curved tongue 3a'. In this embodiment, the downwardly turned tongue 3a' is of sufficient length to intercept the longitudinal path or face the locus of edge cover member 4 of second shutter curtain, when moved, so as to function as a light-shielding member. Although the last construction somewhat increases mass of the first shutter curtain 1 including edge cover member 3', ease in the fabrication of the light-shielding member, as well as an increased durability of the light-shielding member result.

According to the present invention, a light-shielding means in the form of projection is provided on the shutter curtain of one shutter means and projects toward the other shutter means, and the outer end or edge of the light-shielding member is positioned in the path or within the locus of reciprocal movement of the other shutter curtain, rather than extending beyond or through the locus. In comparison to an earlier device, in which a light-shielding member includes a free end portion of a substantially S-shaped edge cover member which extends through or beyond the locus of reciprocal movement of the other shutter curtain member toward the film surface, the light-shielding member, according to the present invention, is of reduced length because of the absence of a portion projecting or extending through or beyond the locus toward the film surface, with a resulting appreciable reduction in the mass of the shutter curtain member.

There is thus avoided any significant undesired increase in the inertia of respective shutter curtains, and any loss of balance in inertia between the two shutter curtain members, with the achievement of a desired uniform exposure.

Since the light-shielding means according to the present invention does not extend through or beyond the locus of reciprocal movement of the other shutter curtain member toward the film surface, as explained above, there is no likelihood of the film surface being broken or scratched or otherwise damaged by the travelling shutter means during the charging of the shutter.

The light-shielding means according to the present invention is achieved merely by providing a projection of the above specified dimensions and relationship resulting in great simplicity in construction and ease of application in contrast to that of the earlier device.

While there have been described and illustrated preferred embodiments of the present invention, it is apparent that numerous alterations, additions and omissions may be made without departing from the spirit thereof.

What is claimed is:

1. A shutter device for a camera comprising:
   first and second shutter means movable between a cocked retracted position wherein said shutter means are biased and a discharged advance position, and respectively including first and second shutter curtains formed of flexible material, said first and second shutter curtains including light-shielding body portions and end border portions which overlap each other when said shutter means are retracted from the discharged position to said cocked position;
   an edge cover member of substantially U-shaped cross-section clamping said end border portion of said first shutter curtain; and
   a light-shielding means separate from said edge cover member and having a projection positioned in the vicinity of said end border portion and projecting towards said second shutter means and having its outermost portion remote from said first shutter curtain positioned within the path of movement of said second shutter curtain.

2. A shutter device as defined in claim 1, wherein said light-shielding means includes a light-shielding member made of a material lighter in weight than that of said edge cover member, said light-shielding member being bonded to said light-shielding body portion of said first shutter curtain.

3. A shutter device as defined in claim 1, wherein said light-shielding means is formed of a thin sheet member of the same material as that of said first shutter curtain.

4. A shutter device as defined in claim 3, wherein;
   said first curtain end border portion is reverse folded and clamped to said first curtain by said cover member and includes a depending curved free end portion defining said light-shielding means.

5. A shutter device as defined in claim 4, wherein said curved free end portion is in the form of a loop.

6. A shutter device as defined in claim 3, wherein said light-shielding means consists of a curved, thin sheet provided separately of said curtain portion, said thin sheet being secured to said first curtain by said edge cover member.

* * * * *